(12) United States Patent
Li et al.

(10) Patent No.: US 9,455,950 B1
(45) Date of Patent: Sep. 27, 2016

(54) SYSTEM AND METHOD FOR IMPLEMENTING TRAFFIC OPTIMIZATION FOR OVERLAY NETWORKS

(71) Applicant: Blue Coat Systems, Inc., Sunnyvale, CA (US)

(72) Inventors: Qing Li, Cupertino, CA (US); Sacheen Kamath, Fremont, CA (US); Min Hao Chen, Milpitas, CA (US); Chris Ciborowski, San Jose, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 120 days.

(21) Appl. No.: 14/214,376

(22) Filed: Mar. 14, 2014

Related U.S. Application Data

(60) Provisional application No. 61/800,347, filed on Mar. 15, 2013.

(51) Int. Cl.
*H04L 12/28* (2006.01)
*H04L 29/12* (2006.01)
*H04L 12/741* (2013.01)

(52) U.S. Cl.
CPC ............. *H04L 61/251* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 2012/0047572 A1* | 2/2012 | Duncan | H04L 63/0245 726/13 |
| 2012/0226782 A1* | 9/2012 | Hawkins | G06F 17/3089 709/219 |
| 2012/0254417 A1* | 10/2012 | Luna | H04L 67/2828 709/224 |
| 2013/0163470 A1* | 6/2013 | Chidambaram | H04L 69/161 370/255 |

* cited by examiner

*Primary Examiner* — Chi H Pham
*Assistant Examiner* — Raul Rivas
(74) *Attorney, Agent, or Firm* — Baker Botts L.L.P.

(57) ABSTRACT

A proxy apparatus includes a processor and a memory storing instructions executed by the processor to determine whether a received packet has a corresponding application proxy and, if so, apply application proxy processing optimizations to the packet plus overlay network optimizations to the packet. Wherein the application proxy processing optimizations include header reduction for header fields that remain static from transmission to transmission.

19 Claims, 8 Drawing Sheets

SYSTEM AND METHOD FOR IMPLEMENTING TRAFFIC OPTIMIZATION FOR OVERLAY NETWORKS

CROSS REFERENCE TO RELATED APPLICATIONS

This application claims priority to U.S. Provisional Patent Application 61/800,347, filed Mar. 15, 2013, the contents of which are incorporated herein by reference.

FIELD OF THE INVENTION

The present invention relates generally to traffic optimization for overlay networks and, in particular, for such optimization as may be used in IPv6-over-IPv4 overlay networks, such as those built on top of the Intra-Site Automatic Tunnel Address Protocol (ISATAP).

BACKGROUND

Many enterprises have started transitioning towards Internet Protocol version 6 (IPv6) for their networks. As this migration to IPv6 takes place, however, many enterprises are operating and will operate both IPv4 and IPv6 networks at the same time, often on the same infrastructure. These enterprises still demand access to application acceleration and protocol optimization techniques that have been deployed for their IPv4 equipment and now require that these optimization techniques be available over IPv6-over-IPv4 overlay networks such as those built on top of the Intra-Site Automatic Tunnel Address Protocol (ISATAP).

SUMMARY

A proxy apparatus includes a processor and a memory storing instructions executed by the processor to determine whether a received packet has a corresponding application proxy and, if so, apply application proxy processing optimizations to the packet plus overlay network optimizations to the packet. Wherein the application proxy processing optimizations include header reduction for header fields that remain static from transmission to transmission.

BRIEF DESCRIPTION OF THE DRAWINGS

The present invention is illustrated by way of example, and not limitation, in the figures of the accompanying drawings, in which.

DETAILED DESCRIPTION

Example embodiments of the present invention are discussed below with reference to the various figures. However, those skilled in the art will readily appreciate that the detailed description given herein with respect to these figures is for explanatory purposes, as the invention extends beyond these embodiments. Described herein are systems and methods for carrying out application acceleration and protocol optimization techniques over overlay networks. Much of the following discussion will focus on IPv6-over-IPv4 overlay networks, such as ISATAP overlay networks, but this is simply for convenience in order to simplify the discussion. Thus, readers should recognize that the solutions provided herein apply to many other types of overlay networks and tunnels (such as generic routing encapsulation (GRE), IP-in-IP, and other such overlay networks).

ISATAP facilitates the automatic creation of tunnels that can carry IPv6 traffic over IPv4 routing infrastructures. Such tunnels can be created between a host and a router, or between two hosts. An ISATAP overlay network is symmetrical because a pair of ISATAP-capable devices (one at each end of the tunnel) is necessary for traffic encapsulation. With ISATAP, an IPv4 address of a tunnel endpoint device is embedded into the last 32 bits of an IPv6 address. This address combined with a designated prefix (e.g., 00:00:5E:FE) forms a 64-bit interface identifier of an IPv6 address.

Figure 1:
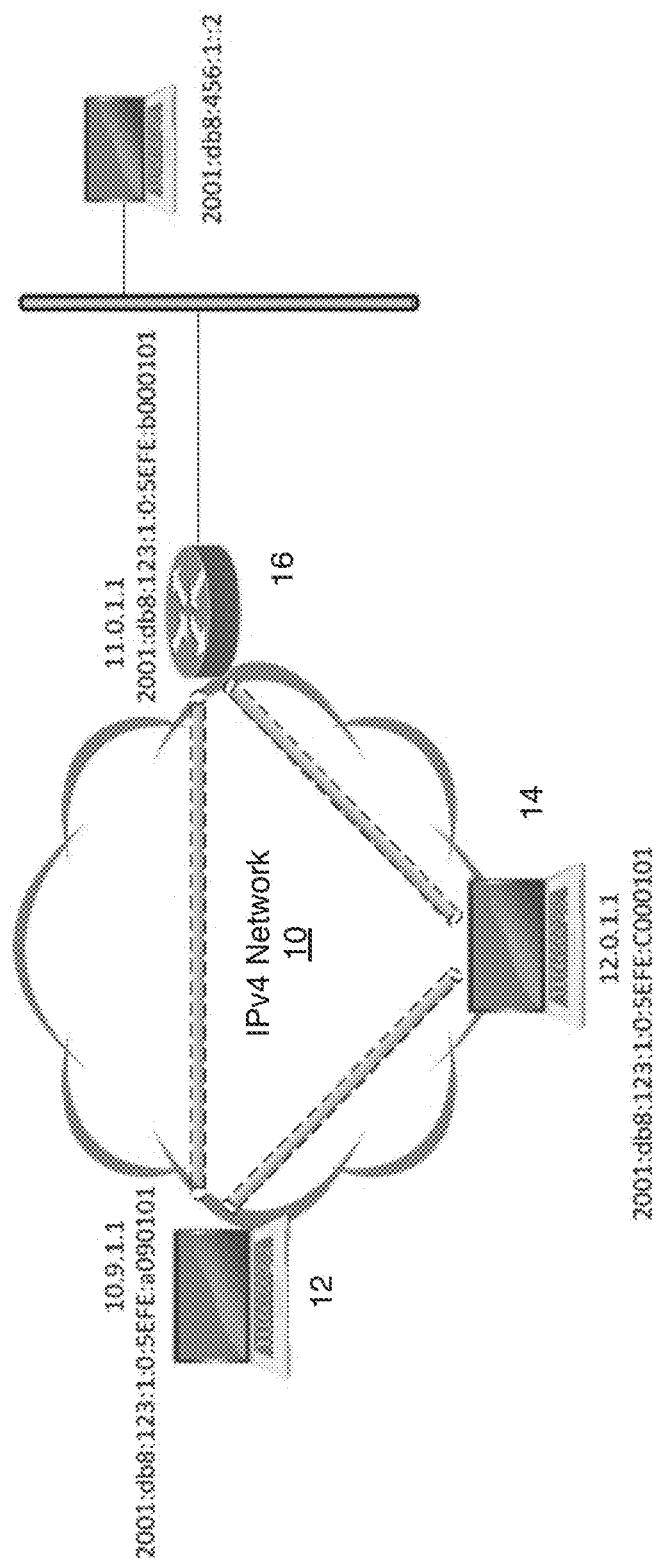
FIG. 1 depicts an example of an IPv4 network configuration and devices that are part of an ISATAP overlay network.
Figure 2:
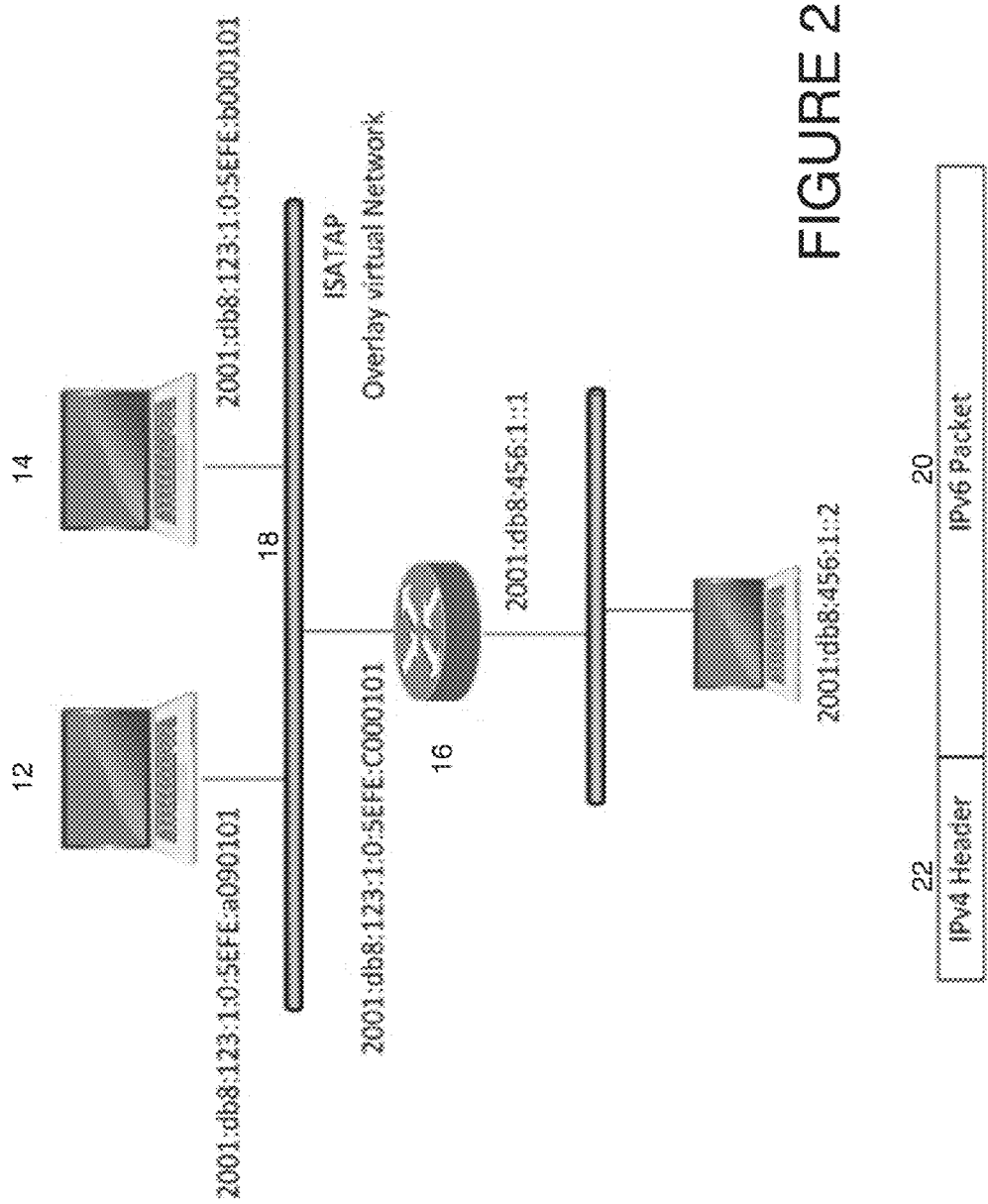
FIG. 2 illustrates an alternative view of the ISATAP overlay network shown in FIG. 1.

FIGS. 1 and 2 depict an example of an IPv4 network 10 and devices that are part of an ISATAP overlay network. Two ISATAP hosts 12, 14 and router 16 are located on the same virtual IPv6 network 18. As illustrated, the last 32 bits of each IPv6 address has the same value as the IPv4 address of each device, respectively. As shown in FIG. 2, each packet 20 transmitted between the ISATAP devices is encapsulated in an IPv4 packet header 22.

Problems associated with this type of overlay network include packet encapsulation or tunnel overhead, the potential for packet fragmentation, and inefficient bandwidth utilization due to the transmission of protocol packets that have minimal packet content variation. The present invention addresses these issues, and more generally, accomplishes application acceleration and optimization in the presence of packet encapsulation. Since common proxies already deal with application protocols that run over the transmission control protocol (TCP) or the user datagram protocol (UDP), but cannot accommodate overlay networks that utilize packet encapsulation, we propose herein a generic proxy that processes and accelerates non-TCP and non-UDP traffic, such as ICMPv6 on the ISATAP overlay network. The generic proxy may also be utilized to accelerate TCP or UDP flows that are not intercepted, thus bypassed by the application proxies.

Packet header compression is a well-known optimization process. Our approach for dealing with headers in overlay networks utilizes a similar principle in that for header fields that remain static from transmission to transmission we provide a high compression ratio. Unlike other schemes that focus mainly on protocol headers, however, our approach performs dictionary-based compression on the overall packet. For TCP and UDP traffic that has an associated application proxy, the header compression takes place first, followed by application and protocol optimization through the proxy, and, optionally, dictionary compression on the proxy-processed payload to obtain additional bandwidth savings. Taking the overall packet into account for compression is necessary because there are multiple layers of packet headers including both IPv4 and IPv6.

Figure 3:
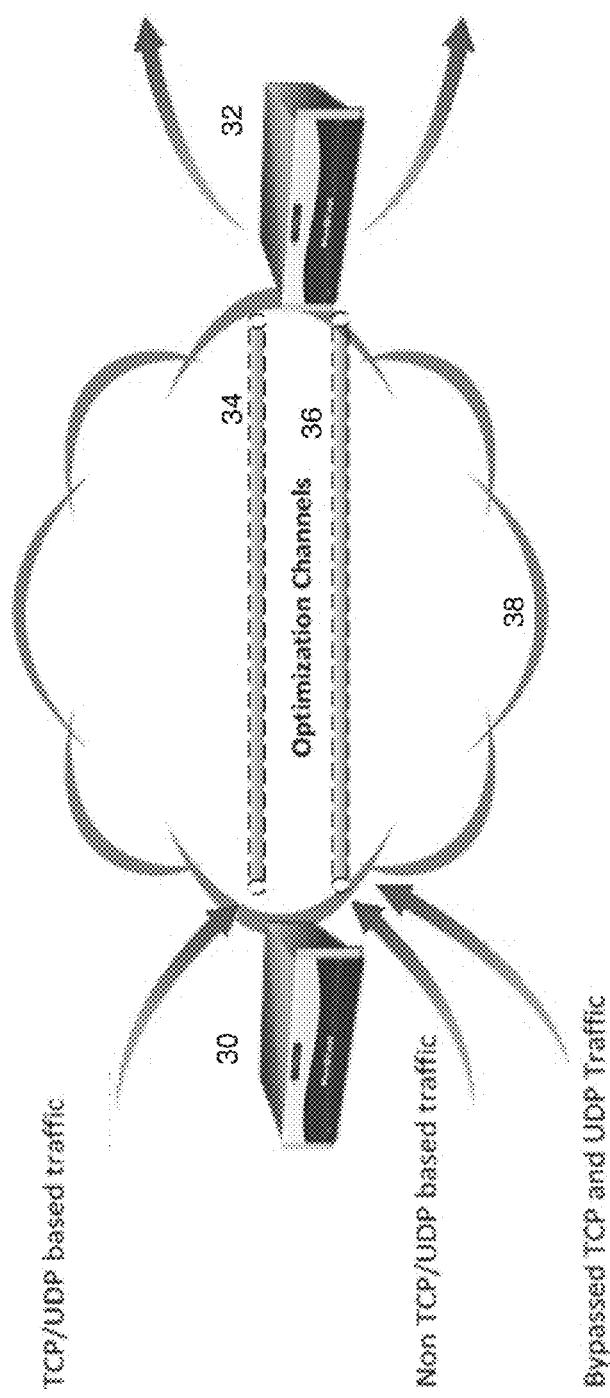
FIG. 3 illustrates the use of a pair of optimization tunnels between a pair of communicating end nodes across a wide area network in accordance with an embodiment of the present invention.

Our general solution architecture is symmetrical and is shown in FIG. 3. Between a pair of communicating end nodes 30, 32, two optimization tunnels 34, 36, are established across a wide area network (WAN) 38. The first optimization tunnel 34, call it a proxy-ISATAP-tunnel, is used to carry traffic that would require processing by an application proxy in addition to processing by the ISATAP overlay optimization module. The second optimization tunnel 36, call it a pure-ISATAP-tunnel, is used to carry non-TCP, non-UDP traffic, and bypassed TCP and UDP traffic, and is only processed by the ISATAP overlay optimization module.

The level of optimization performed in or for each tunnel is different. In the proxy-ISATAP-tunnel 34, protocols such as HyperText Transfer Protocol (HTTP), Common Internet File System (CIFS) or Message Application Programming Interface (MAPI) are optimized through the actions of one or more associated application proxies. When appropriate, these application proxies may also employ object caching. In the pure-ISATAP-tunnel 36, a generic proxy is constructed to intercept packets in order to perform header reduction and overall packet compression-based optimization functions. Each pair of optimization tunnels is created for a pair of communicating nodes 30, 32, based on the IPv4 addresses of the encapsulation layer, as described in detail below.

It should be appreciated that proxy 30 is associated with a first network, while proxy 32 is associated with a second network. The optimization tunnel created by the generic proxy is a TCP connection. L2/L3 traffic is passed into this pipe for optimization, and L2/L3 traffic is reproduced on the other end of the pipe. Consequently, the first network and the second network are treated as one big (virtual) network. Any traffic that is generated is optimized across the WAN 38. The L2/L3 protocols were designed to operate over a LAN not a WAN. Without this disclosed feature, not only the WAN bandwidth utilization would be saturated with a high cost, but the performance demanded by the L2/L3 protocol operations would not be met. For any L4 to L7 traffic, if there is no specific proxy built for the traffic, then the traffic is optimized by the generic proxy. Thus, in accordance with an embodiment of the invention, protocol optimization is based upon a specially built proxy or a generic proxy. In other words, an embodiment of the invention detects traffic or application type and then applies a proper optimization system.

1. Client-to-Optimizer Communication.

Figure 4:
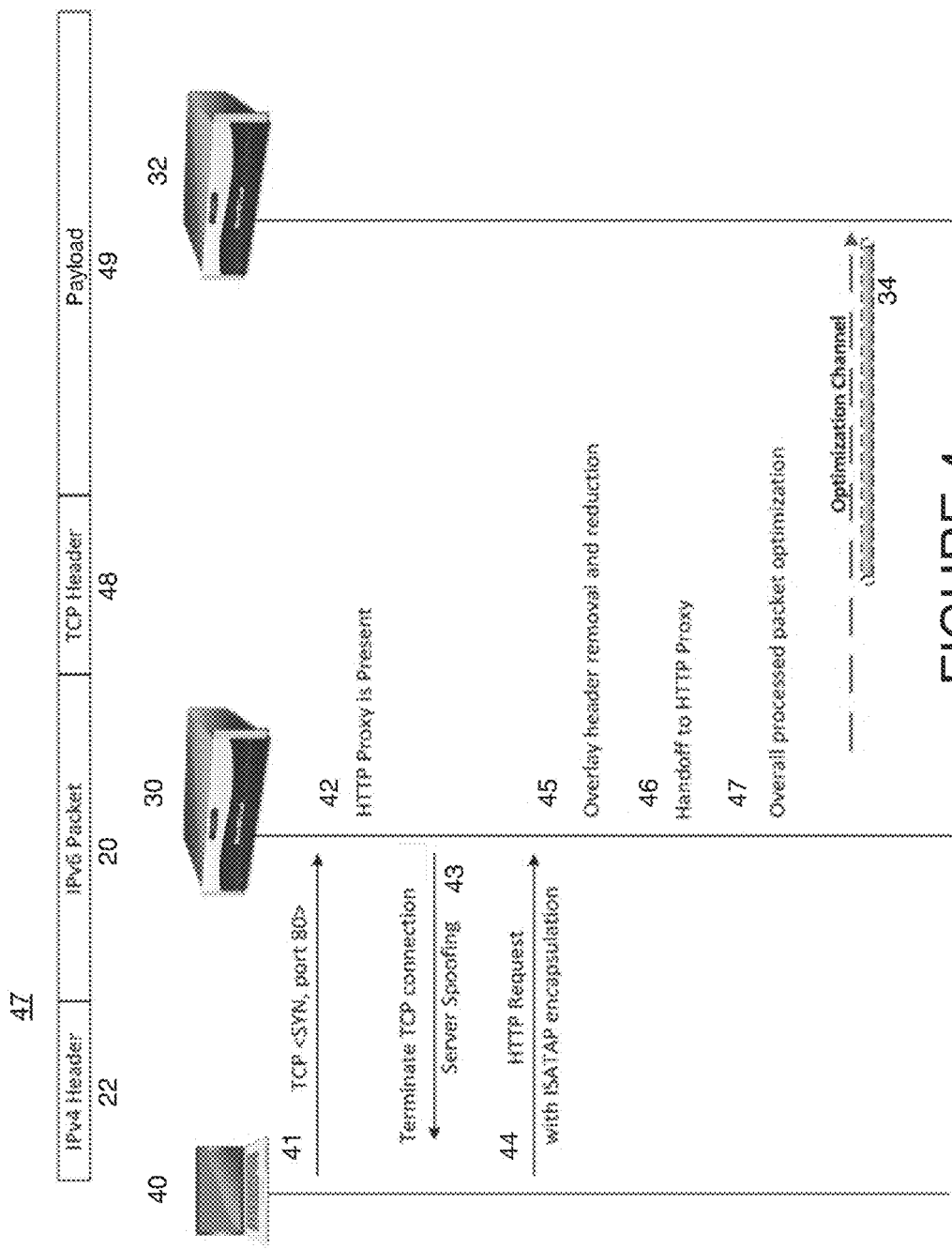
FIG. 4 illustrates communications between a client and an optimizer appliance, and the functions performed at the optimizer, in accordance with an embodiment of the present invention.

The communication between a client 40 and an optimizer appliance 30, and the functions performed at the optimizer, are illustrated through an example shown in FIG. 4. In this example, client 40 issues an HTTP request 41 on the ISATAP overlay network. The request 41 includes a TCP SYN packet and reaches the first optimizer 30 that is deployed inline. Once the optimizer receives the TCP SYN packet, it uses an internal traffic classification engine to identify the traffic as potential HTTP traffic, verifies an associated HTTP proxy is present 42, and then terminates the TCP connection as if the optimizer were the content server 43. This process is sometimes known as server spoofing. The client 40 then issues an HTTP request 44 on this intercepted TCP connection.

The intercepted TCP connection is made up of a series of packets, such as packet 47, which includes a TCP header 48 and payload 49. In the case of IPv6-inIPv4, there will also be respective protocol headers 20 and 22. The optimizer 30 receives the packets, recognizes them as TCP6-in-TCP4 (e.g., by examining the different layers of protocol headers) and as a first step in the optimization process removes the IPv4 overlay header 45. The optimizer then passes the remaining portions of the original packet 47 to an HTTP proxy 46. The HTTP proxy first checks its object cache to determine if a local copy of the requested content is present and, if so, returns that cached content to the client (see FIG. 6). If the local cache does not have the requested content, then the HTTP proxy forwards the request to an ISATAP overlay module. The ISATAP overlay optimizer performs dictionary-based compression on the packet, and transmits a fully optimized packet over the optimization channel 34 to its peer optimizer 32 on the other end of the WAN. Further TCP traffic is processed in a similar fashion on a connection-by-connection basis.

The above assumes that the traffic received at the optimizer 30 is TCP or UDP traffic with an associated application proxy (an HTTP proxy in the above example). In the case of non-TCP or non-UDP traffic, or for TCP/UDP traffic with no dedicated application proxy, a different processing regime, one which includes a generic proxy rather than a dedicated application proxy, is used. In such instances, when a packet is received, a check is made to determine if an existing pure-ISATAP-tunnel for the traffic exists. This may be done, for example, based on the IPv4 source and destination addresses included in the IPv4 header. If no existing tunnel is present, a new pure-ISATAP-tunnel is created as soon as the generic proxy detects the new ISATAP tunnel endpoints. Subsequently received packets will be communicated via this newly fashioned optimization channel on a packet-by-packet basis. All data communication that takes place between the same IPv4 pair of ISATAP tunnel end points is transferred using the same optimization channel.

2. Optimizer-to-Content Server Communication.

Figure 5:
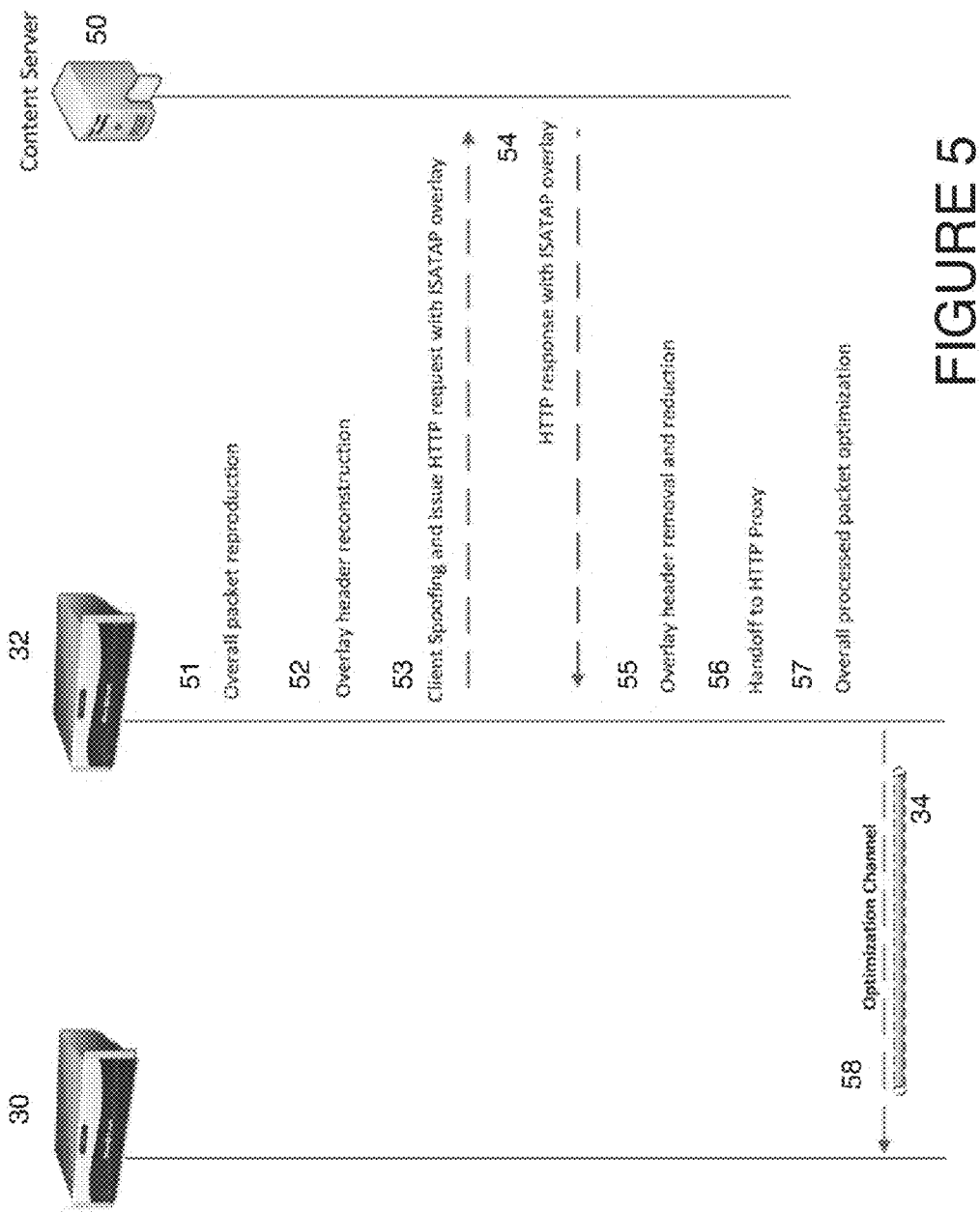
FIG. 5 illustrates communications between an optimizer appliance and a content server, in accordance with an embodiment of the present invention.

Returning to the example of an HTTP request issued by a client, once the peer optimizer 32 receives the fully optimized packet it decompresses and reproduces the original packet 51, as shown in FIG. 5. This includes reconstructing the ISTAP overlay header 52, so that the resulting packet is identical to the packet that was originally generated by the client. At this point the peer optimizer issues the HTTP request to the content server 50 as if it were the client. This process is sometimes known as client spoofing 53 (FIG. 5 omits the TCP exchange phase to simplify discussion).

Figure 6:
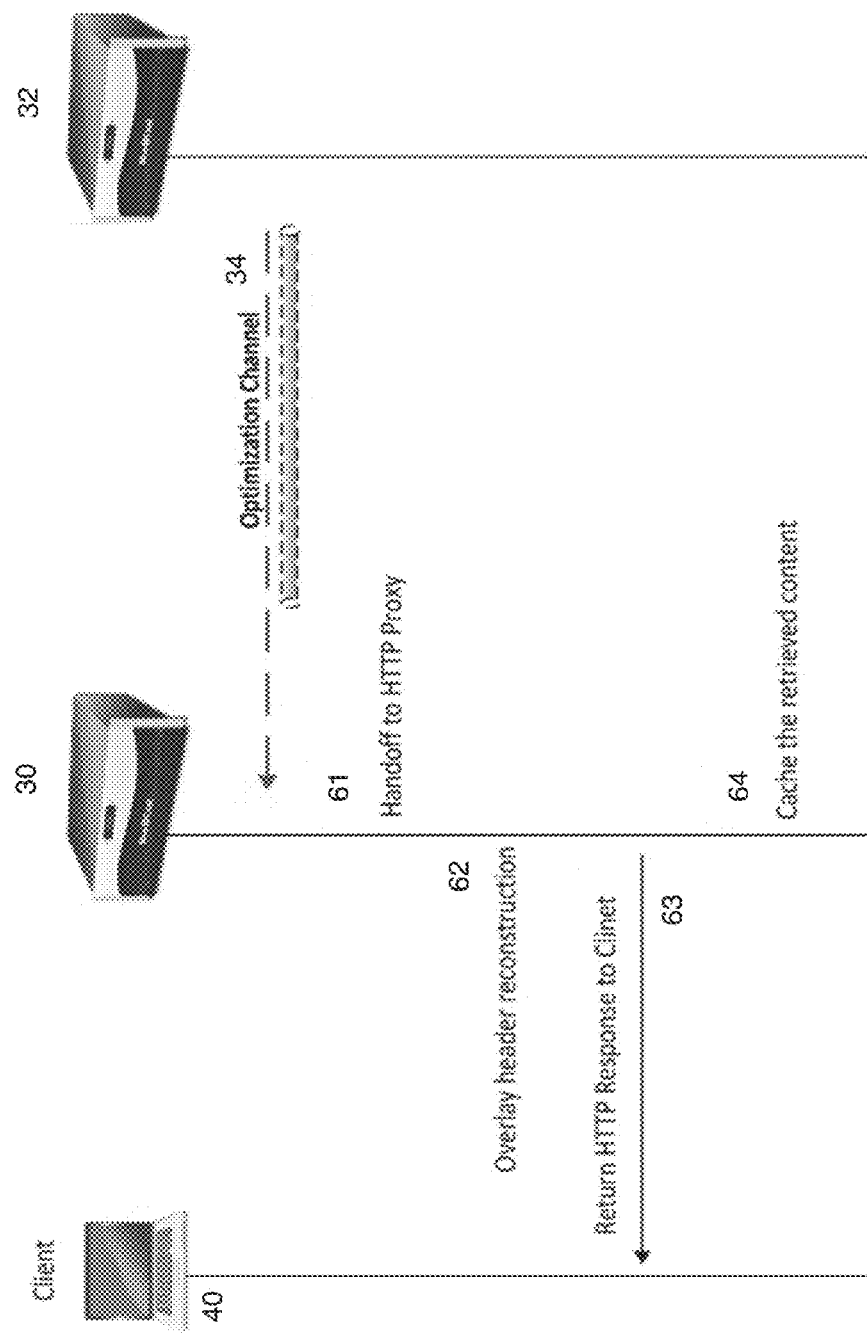
FIG. 6 illustrates communications between the optimizer appliance and client shown in FIG. 4, and the functions performed at the optimizer, when requested content is available to be returned to the client in accordance with an embodiment of the present invention.

The server 50 responds to the HTTP request and returns the content that is encapsulated inside an ISATAP overlay 54. The peer optimizer 32 then has to perform similar optimization steps as those performed on the client request, including overlay header removal 55, handoff to the HTTP proxy 56, and overall packet optimization 57, and transmits 58 the optimized response frames back to the client side optimizer 30. As can be seen in FIG. 6, the client-side optimizer 30 (including the HTTP proxy) then performs similar functions as those performed by the server-side optimizer 32 (which also includes the HTTP proxy). The HTTP proxy as described here is sometimes known as a split proxy, and is described in detail in commonly-owned U.S. Patent Publication 2007/0245090, incorporated herein by reference. For both the proxy-ISATAP-tunnel and the pure-ISATAP-tunnel, the IPv6 headers that include any IPv6 extension headers that are present in the original packet and the payload are preserved.

3. Returning the Response to the Client.

As shown in FIG. 6, when the client side optimizer 30 receives the optimized packet over the optimization channel 34, it hands the packet off to the HTTP proxy 61 and then reconstructs the ISATAP overlay header 62 before returning 63 the HTTP response to the client 40. These operations ensure that the returned packet is identical to the packet that was originally generated by the content server. One additional function performed by the optimizer is to cache the retrieved content 64 if possible so that future requests for the same content can be fetched from the local cache instead of reissuing the same request over the WAN.

For a pure-ISATAP-tunnel, since the data is processed on a per-packet basis, the server-to-client flow is identical to the client-to-server flow. For example, an ICMPv6 reply will be processed in the same way as a ICMPv6 request, with the exception that it is now intercepted on the server-side optimizer instead of the client-side optimizer. The client-side and server-side optimizers may share the optimization channel information and reuse the channel if necessary.

4. A Generic Proxy and Application Delivery Network (ADN).

Figure 7:
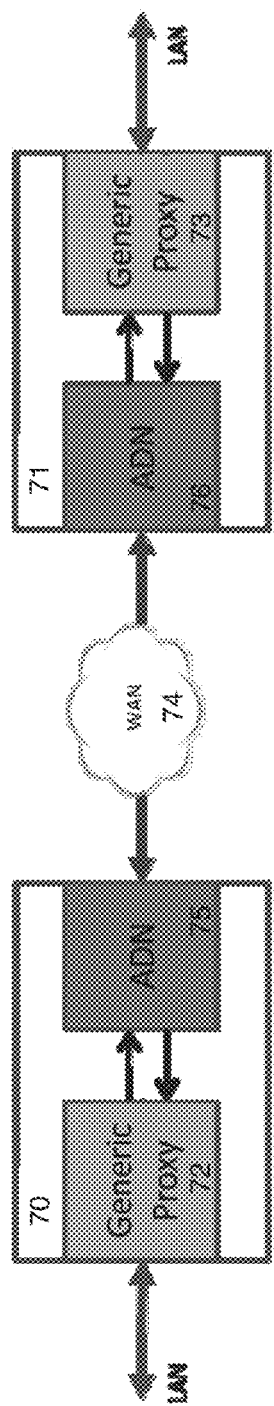
FIG. 7 illustrates the communications between generic proxies and ADNs across a WAN in a split proxy model, in accordance with an embodiment of the present invention.
Figure 8:
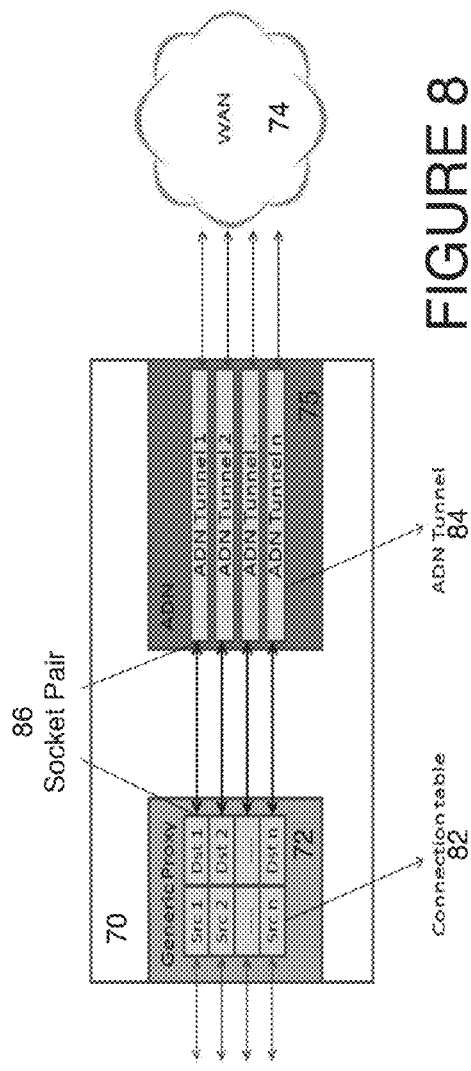
FIG. 8 illustrates a connection table for a generic proxy configured in accordance with embodiments of the present invention and the mappings of connections to ADN tunnels.

As indicated above, in the case of non-TCP or non-UDP traffic or for TCP/UDP traffic that does not have a dedicated application proxy at the optimizer, a generic proxy is used. The generic proxy and a companion ADN work in a split proxy model, which means that for a given traffic flow there is a component of the generic proxy 72, 73 and ADN 75, 76 on each of a pair of optimizer appliances 70, 71 on respective sides of a WAN 74, as shown in FIG. 7. Referring briefly to FIG. 8, each generic proxy maintains a table of tunnels (connection table 82) indexed by source and destination addresses (from the IPv4 header). These tunnels are only conceptual and identify a "flow" (between IPv4 endpoints) based on a unique source and destination address combination. The actual tunnel over the WAN 74 is achieved using ADN tunnels 84. So these generic proxy tunnels have a one-to-one mapping to ADN tunnels.

When an IPv4 encapsulated packet is received, the generic proxy performs a table lookup to find an existing tunnel. If the lookup fails, it means that this is a new flow and, hence, a tunnel has to be formed for it. The generic proxy invokes the ADN to create a tunnel for this new flow. A successful lookup indicates that there is an existing ADN tunnel that services this source and destination IPv4 address.

The ADN is informed of the IP encapsulation header and optimization policy (byte-cache, compression, etc.) during set up of the tunnel. In order to setup the ADN tunnel (to find its peer ADN at the server-side optimization appliance, known as the concentrator), the ADN performs an ADN route lookup on the destination address in the IP encapsulation header. On a successful route lookup, the ADN exchanges the IP encapsulation header with the concentrator during a tunnel setup handshake. This setup need only be performed once. Once the tunnel has been setup, the ADN treats this as any other tunnel and only the data is exchanged (e.g., after byte-caching and compression).

As part of the tunnel setup, the ADN on the concentrator also informs (hands off to) the generic proxy of the new tunnel, thus letting it populate its table of tunnels with the new source and destination IP tuple. By doing so, the generic proxy on the ADN concentrator is able to match the reverse packets to the existing ADN tunnel.

The generic proxy and the ADN tunnel exchange data via a socket pair 86 that is created during the ADN tunnel setup. Thus, each unique generic proxy tunnel and ADN tunnel combination has a socket pair between them, one on the client-side optimization appliance (the "branch") and one on the concentrator. Only the encapsulated data (including the IPv6 header for an IPv6-in-IPv4 packet) is exchanged over the socket pair. The ADN treats this data read from the socket pair as any other data (like a read from a traditional proxy protocol), performing byte-caching and compression (if the configuration policy so dictates) of the whole data (including the IPv6 header for an IPv6-in-IPv4 packet). The ADN maintains the message boundary for data received from each read from its end of the socket pair. This message boundary is maintained as this data is transferred across the tunnel and delivered to the corresponding generic proxy tunnel on the peer optimization device on the other side of the WAN link. The generic proxy tunnel maintains the message boundary for the data it reads from its client/server side socket and the write onto its end of the socket pair and also for the data it reads from the socket pair and writes to its client/server socket. The protocol stacks at the optimizer appliances ensure this message boundary is maintained when data is delivered across the ADN. In one embodiment, the generic proxy may time out a flow within a certain predetermined time interval (e.g., two minutes) if no activity is observed and then proceeds to clean up the associated tunnel records.

5. Traditional Proxy Service and ADN.

The ADN's behavior to support IP encapsulated packets that are serviced by a proxy on the optimization appliance is similar to what it does for the generic proxy. This scenario does not require a split proxy model unless the proxy service itself demands it. The IP encapsulation header is exchanged between the proxy and ADN and a bit flag is set. When ADN observes this bit flag, it uses the destination address in the IP encapsulation header to perform a route lookup. This is in lieu of using a destination address specified by the protocol proxy, which continues to act as though it is connecting to the encapsulated IPv6 address (in case of IPv6-in-IPv4 deployments).

When the ADN finds a concentrator that fronts the IPv4 address in the encapsulation header, it forms an explicit tunnel to it, exchanging the IP encapsulation header information during a tunnel connection handshake. Subsequent data on that tunnel need not transfer the IP encapsulation header once the tunnel is established. When the concentrator connects to the content server, it stores the header information for the connection and recreates the encapsulated packet for all subsequence packets on the flow. Thereafter, the ADNs may treat this connection as any other from the protocol proxy. Even in case of proxies that operate in a split proxy mode (and it is a protocol proxy on the concentrator that connects to the content server), the connection to the content server is first made by the concentrator ADN and only when the connection is successful, is the connection handed off to the split proxy's protocol proxy. This way, the split proxy protocol proxy does not need to separately accommodate the IP encapsulation.

6. Performance Evaluation

To evaluate the performance of our solution we measured header reduction and dictionary-based compression for several test scenarios. In this analysis we focused on the HTTP and CIFS protocols because they are the ones most often encountered with applications deployed over a WAN in an enterprise environment.

The test setup consisted of two hosts, two peer optimization appliances and one WAN simulator to simulate a T1 link. Table 1 lists values for various link parameters. The topology is identical to the deployment scenario illustrated in FIG. 1. The test hosts were IPv4 and IPv6 dual stack capable and each was configured with an ISATAP interface.

TABLE 1

Simulated T1 link parameter settings.

| Parameter | Value |
| --- | --- |
| Bandwidth | 1.55 Mbps |
| Latency | 3 ms round trip time |
| Packet Drops | 0% |
| Packet Reordering | 0% |

Eleven files (randomly selected) with sizes distributed between 3.5 MB-51 MB were used in the test runs. The basic test sets and data collection are described in Table 2.

TABLE 2

The Simulated T1 Link Settings

| Test # | Description |
| --- | --- |
| 1 | Transfer the test files one by one from Host A to Host B using the HTTP protocol on IPv4 and record the transfer time for each file. |
| 2 | Transfer the same test files in the same order from Host A to Host B using the HTTP protocol on ISATAP overlay network and record the transfer time of each file. |
| 3 | Transfer the test files one by one from Host A to Host B using the CIFS protocol on IPv4 and record the transfer time for each file. |
| 4 | Transfer the same test files in the same order from Host A to Host B using the CIFS protocol on the ISATAP overlay network and record the transfer time of each file. |

Throughput degradation (td) was used to measure the performance gain from header reduction. It is calculated as the difference of effective throughput (et) between IPv4 and ISATAP. Effective throughput is calculated as file size (fs) divided by transferring time (tt).

$et=fs/tt$ $td=(et\text{IPv4}-et\text{ISATAP})/et\text{IPv4}$

Effective throughput is used to measure the performance gain from dictionary-based compression. As the performance of dictionary-based compression is not related to the protocol headers, we measured the performance on ISATAP.

Our experiments determined that for HTTP transfers the throughput degradation introduced by ISATAP is about 5% without any optimization. After performing header reduction over our WAN optimizer the throughput degradation was completely eliminated.

Using CIFS to transfer the test files, the throughput degradation introduced by ISATAP is approximately 3.5% without any optimization. After performing header reduction over our WAN optimizer the throughput degradation was reduced to 0.5%.

We determined that effective throughput for both HTTP and CIFS increased significantly (with the use of our optimization techniques) because of the high compression ratio achieved by the dictionary compression. The test results indicated tremendous bandwidth savings when the same traffic was transferred and optimized by the dictionary-based compression.

Figure 9:
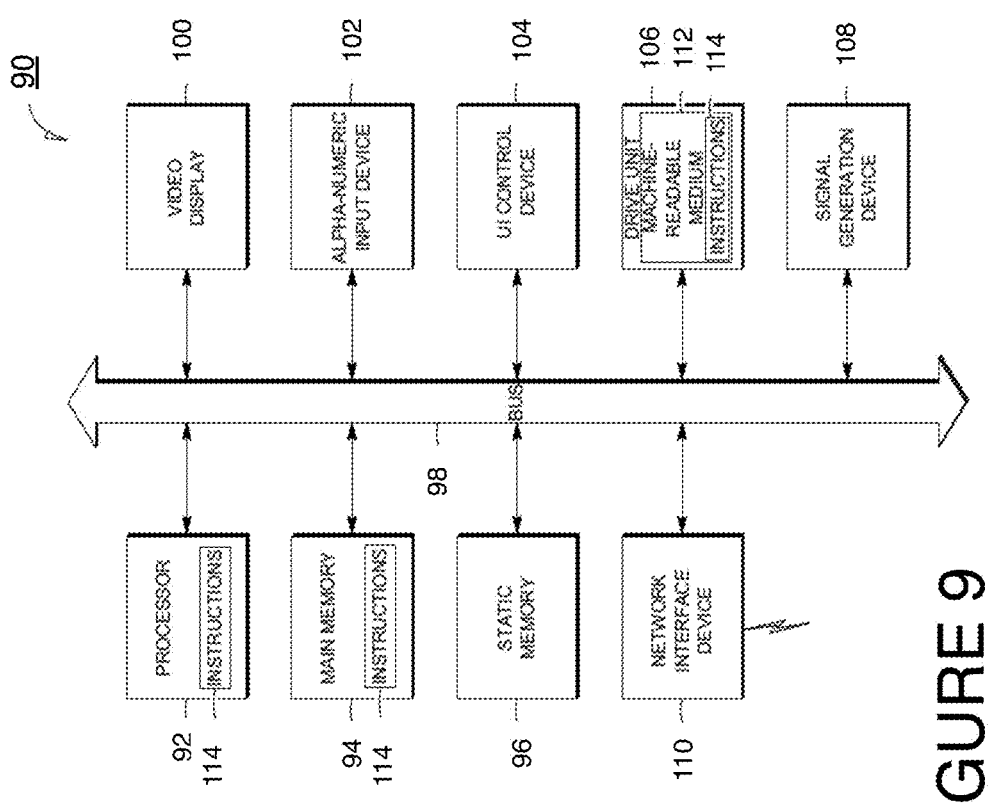
FIG. 9 is a diagrammatic representation of a computer system within which a set of instructions for causing the computer system to perform any one or more of the methods, processes, operations or methodologies discussed herein may be executed.

FIG. 9 shows a diagrammatic representation of a computer system 90 within which a set of instructions for causing the computer system to perform any one or more of the methods, processes, operations or methodologies discussed herein may be executed. In some examples the computer system 90 may be an optimization appliance as discussed above. In addition, the computer system 90 may represent a server or a client machine which is accessed by or accesses the optimization appliance. Further, while only a single machine is illustrated, the term "machine" should also be understood to include any collection of machines that individually or jointly execute a set (or multiple sets) of instructions to perform any one or more of the methodologies discussed herein. Example embodiments may also be practiced in distributed system environments where local and remote computer systems that that are linked (e.g., either by hardwired, wireless, or a combination of hardwired and wireless connections) through a network, both perform tasks. In a distributed system environment, program modules may be located in both local and remote memory-storage devices (see below).

The example computer system 90 includes a processor 92 (e.g., a central processing unit (CPU), a graphics processing unit (GPU) or both), a main memory 94 and a static memory 96, which communicate with each other via a bus 98. The computer system 90 may further include a video display unit 100 (e.g., a liquid crystal display (LCD)). The computer system 90 may also include an alphanumeric input device 102 (e.g., a keyboard), a user interface (UI) controller 104 (e.g., a mouse, hard buttons, etc.), a disk drive unit 106, a signal generation device 108 (e.g., a speaker) and one or more network interface devices 110 (e.g., a WiFi and/or other transceiver). The disk drive unit 106 includes a machine-readable medium 112 on which is stored one or more sets of instructions 114 and data structures (e.g., software) embodying or used by any one or more of the methodologies or functions illustrated herein. The software may also reside, completely or at least partially, within the main memory 94 and/or within the processor 92 during execution thereof by the computer system 90, with the main memory 94 and the processor 92 also constituting machine-readable media. As used herein, the term machine-readable medium should be taken to include a single medium or multiple media (e.g., a centralized or distributed database, and/or associated caches and servers) that store the one or more sets of instructions. The term machine-readable medium should also be taken to include any tangible medium that is capable of storing, encoding, or carrying a set of instructions for execution by the machine and that cause the machine to perform any of the one or more of the methodologies illustrated herein. The term machine-readable medium shall accordingly be taken to include, but not be limited to, solid-state memories, and optical and magnetic medium.

The embodiments described herein may generally be implemented as hardware and/or software logic embodied in a tangible, i.e., non-transitory, medium that, when executed, is operable to perform the various methods and processes described above. That is, logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

The steps associated with the methods of described above may vary in different embodiments of the invention. Therefore, the present examples are to be considered as illustrative and not restrictive, and the examples is not to be limited to the details given herein, but may be modified within the scope of the appended claims.

What is claimed is:

1. A proxy apparatus, comprising:
    a processor; and
    a memory storing instructions executed by the processor to:
      determine whether a received packet has a corresponding application proxy and, if so, apply application proxy processing optimizations to the packet plus overlay network optimizations to the packet, wherein the application proxy processing optimizations include header reduction for header fields that remain static from transmission to transmission, and wherein the overlay network optimizations support optimization techniques across two different protocols; and
    further comprising instructions executed by the processor to determine whether a received packet does not have a corresponding application proxy, and if so, invoke and execute a generic proxy for optimizing the packet, wherein prior to optimizing the packet, the instructions determine whether an existing optimization tunnel exists and, if so, utilizes the existing optimization tunnel to transmit the optimized traffic across a computer network, otherwise, if no existing optimization tunnel exists, the generic proxy invokes creation of an optimization tunnel to transfer the traffic.

2. The proxy apparatus of claim 1 wherein the application proxy processing optimizations include operating the proxy apparatus to perform server spoofing with respect to a client device.

3. The proxy apparatus of claim 1 wherein the application proxy processing optimizations include object caching.

4. The proxy apparatus of claim 1 wherein the application proxy processing optimizations include operating the proxy apparatus to perform client spoofing with respect to a client device.

5. The proxy apparatus of claim 1 wherein the overlay network optimizations include overlay header removal and reduction.

6. The proxy apparatus of claim 1 further comprising instructions executed by the processor to perform overall packet reproduction for a packet received from a peer proxy apparatus.

7. The proxy apparatus of claim 1 further comprising instructions executed by the processor to perform overlay header reconstruction for a packet received from a peer proxy apparatus.

8. The proxy apparatus of claim 1 further comprising instructions executed by the processor to form application delivery network tunnels.

9. The proxy apparatus of claim 8 further comprising instructions executed by the processor to note upon the formation of a new application network tunnel encapsulation header and optimization policies for the new application network tunnel.

10. The proxy apparatus of claim 1 further comprising instructions executed by the processor to form a table of tunnels indexed by source and destination addresses.

11. The proxy apparatus of claim 1 further comprising instructions executed by the processor to perform dictionary based compression on the overall received packet.

12. The proxy apparatus of claim 1 further comprising instructions executed by the processor to process traffic on a connection-by-connection basis when the received packet has a corresponding application proxy and a packet-by-packet basis when the received packet does not have a corresponding application proxy.

13. The proxy apparatus of claim 1 further comprising instructions executed by the processor to determine whether a received packet does not have a corresponding application proxy, and if so, invoke and execute a generic proxy.

14. A method of optimizing traffic for an overlay network, comprising receiving the network traffic at first optimization appliance, determining whether the network traffic comprises transmission control protocol (TCP) or user datagram protocol (UDP) traffic that has an associated application proxy at the first optimization appliance and, if so,
    (a) compressing header information of the traffic to produce compressed traffic, applying application and protocol optimization to the compressed traffic using the associated application proxy to produce proxy-processed traffic, dictionary compressing the proxy-processed traffic to produce fully optimized traffic, and transmitting the fully optimized traffic across a computer network communicatively coupled to the first optimization appliance;
    otherwise if the traffic does not have an associated application proxy at the first optimization appliance,
    (b) optimizing the traffic using a generic proxy at the first optimization appliance to create optimized traffic, and transmitting the optimized traffic across the computer network over an optimization tunnel to an endpoint at a second optimization appliance;
    wherein the overlay network supports optimization techniques across two different protocols; and
    wherein prior to optimizing the traffic using a generic proxy, the first optimization appliance determines whether an existing optimization tunnel to the endpoint at the second optimization appliance exists and, if so utilizes the existing optimization tunnel when transmitting the optimized traffic across the computer network, otherwise, if no existing optimization tunnel exists, the generic proxy invokes creation of the optimization tunnel to the endpoint at the second optimization appliance prior to transferring the traffic to the endpoint across the optimization tunnel.

15. The method of claim 14, wherein if the traffic does have an associated application proxy at the first optimization endpoint, the traffic is processed on a connection-by-connection basis at the first optimization appliance, otherwise, if the traffic does not have an associated application proxy at the first optimization appliance, the traffic is processed on a packet-by-packet basis at the first optimization appliance.

16. The method of claim 14, wherein the generic proxy is configured to remove any overlay headers from the traffic, then pass the traffic to an overlay optimization module that is configured to perform dictionary-based compression on the traffic received from the generic proxy before transmitting the optimized traffic across the computer network.

17. The method of claim 14, wherein determining whether or not an existing optimization tunnel exists is based on source and destination addresses from an IPv4 header in packets of the traffic received at the first optimization appliance.

18. The method of claim 17, wherein when the generic proxy invokes creation of the optimization tunnel to the endpoint at the second optimization appliance, an associated application delivery network (ADN) component at the first optimization appliance is informed of an optimization policy for the optimization tunnel, the ADN component at the first optimization appliance locates a peer ADN component at the second optimization appliance, performs an ADN route lookup on a destination address specified in an encapsulation header of a packet of the traffic and, on a successful route lookup, exchanges the encapsulation header with the AND component at the second optimization appliance during a tunnel setup handshake.

19. The method of claim 14, wherein the generic proxy maintains a connection table specifying mappings to different endpoints across the computer network and a connection to the optimization tunnel to the second optimization appliance is selected from the connection table according to source and destination addresses from packets of the traffic.

\* \* \* \* \*